United States Patent [19]

Cutler

[11] 3,870,496

[45] Mar. 11, 1975

[54] METHOD OF CREATING A FOAMED GLASS PRODUCT FROM WASTE GLASS

[75] Inventor: Ivan B. Cutler, Salt Lake City, Utah

[73] Assignee: University of Utah, Salt Lake City, Utah

[22] Filed: Sept. 12, 1973

[21] Appl. No.: 387,883

Related U.S. Application Data

[63] Continuation of Ser. No. 174,220, Aug. 23, 1971, abandoned.

[52] U.S. Cl. ................................. 65/22, 106/40 V
[51] Int. Cl. ........................................... C03b 19/08
[58] Field of Search ............... 65/20, 22; 106/40 V; 178/220

[56] References Cited
UNITED STATES PATENTS

| | | | |
|---|---|---|---|
| 2,955,049 | 10/1960 | Booth et al. | 106/40 V |
| 3,443,920 | 5/1969 | Overcashier et al. | 65/22 |
| 3,692,507 | 9/1972 | Gladney et al. | 65/22 X |

Primary Examiner—Robert L. Lindsay, Jr.

[57] ABSTRACT

A method of creating a foamed glass product from glass material such as waste glass by first modifying the glass structure with hydroxide (OH) groups and thereafter softening the glass with heat and releasing the hydroxide groups to thereby foam the glass. Glass structure is readily modified by suitably reacting it with water or some other hydroxide group (OH) furnishing medium. The modified glass is foamed by first heating to soften the same and second, to cause the release of the hydroxide modifier groups. The released hydroxide modifier groups react to form water vapor which in turn causes the softened glass to foam. Release of the hydroxide groups from the glass structure also raises the temperature at which the glass softens with the result that the water vapor thus formed is trapped in the stiffened glass to thereby form a stiffened cellular glass product.

3 Claims, No Drawings

METHOD OF CREATING A FOAMED GLASS PRODUCT FROM WASTE GLASS

This application is a continuation of my copending application Ser. No. 174,220, filed Aug. 23, 1971 now abandoned.

This invention discloses a method whereby glass without naturally occurring hydroxide modifier groups within the glass structure is suitably treated or modified with hydroxide groups such that the then modified glass is usable in a subsequent foaming operation. Applicant by his invention further proposes such a method for modifying waste glass materials with hydroxide groups and thereafter foaming the same to create thereby a structurally useful material.

Glass manufactured from silica sand has usually been modified with elements such as sodium, et., and generally does not have sufficient available hydroxide groups within the glass structure to cause the type of foaming reaction as set forth in this invention. Before manufactured glass, generally readily available as a waste glass product, could be used in a foaming operation as described herein, its structure would, of necessity, have to be modified with hydroxide groups.

To use waste glass as a foamed structural material, as taught by this invention, it is necessary to modify the glass structure with hydroxide groups to create a product very similar to a natural glass. The invention set forth herein describes such a method for modifying glass with hydroxide groups by reacting the glass with a hydroxide group furnishing medium such as water.

Glass commercially used in operations such as bottle or jar manufacture, window glass manufacture, etc., normally does not contain sufficient quantities of hydroxide groups bonded to the atoms within the glass structure to render the glass usable in its present state as a raw material for manufacture of foamed glass.

Natural glass such as perlite, volcanic glass, pumice, and certain types of clay products, does, on the other hand, contain a relatively high concentration of hydroxide groups bonded to the silicon-oxygen network in the glass structure. When this natural glass material is treated in a high temperature environment such as a furnace or flame gun, the hydroxide modifier groups are released and thereafter react to form water vapor. The softened glass therefore tends to foam or otherwise froth and, upon stiffening, retain the cellular characteristic of the foamed material. It is for this reason that certain natural glasses have found ready application in the construction and insulation industries as foamed products.

It should be readily apparent that applicant by his invention proposes to produce a valuable material for the construction and/or insulation industries by utilizing as a raw material, for example, waste glass materials which would otherwise constitute a solid waste disposal problem.

Use of such waste glass as the raw material is further enhanced since coloration of waste glass material makes little or no difference in the desirability of the resultant foamed glass as a structural material.

It has further been found that the hydroxide groups which modify the glass structure also cause a lowering of the softening point of the glass. Release of these modifier groups allows the glass to reform certain bonds within the glass structure which, in turn, raises the temperature at which the glass softens. The end result of the release of the modifier groups and raising of the softening point of the glass is that the foamed glass stiffens and thus more readily retains its foamed or spumiform characteristic even though the temperature remained substantially constant.

Applicant by his invention greatly reduces the cost of producing a foamed glass product by modifying unsorted, finely divided waste glass with hydroxide groups. The hydroxide groups are readily furnished by water, for example. This invention not only produces a very desirable product for the construction or insulation industries but also greatly enhances the beneficial use of waste glass which would ordinarily constitute a solid waste disposal problem.

It is therefore an object of this invention to provide a method for modifying a glass structure with hydroxide groups.

It is another object of this invention to provide a method for modifying waste glass materials with hydroxide groups.

It is an even still further object of this invention to provide a method for turning a waste glass product into a valuable raw material for production of components useful in the construction industry.

It is an even still further object of this invention to provide improvements in the utilization of waste glass materials.

It is an even further object of this invention to provide improvements in the solution of solid waste disposal problems.

These and other objects of this invention will become more readily apparent from the following description.

Water reacts chemically with the glass to supply the hydroxide (OH) modifier groups which behave in a manner similar to modifier atoms or other ions currently in use in glass manufacture as glass structure modifiers. It is believed that the mechanism involved in modification of the glass structure with hydroxide groups is a severing of one side of an oxygen bond linking two silicon atoms and thereafter attaching one hydroxide (OH) supplied by the water ($H_2O$) to one silicon atom and attaching the remaining hydrogen atom from the water to the oxygen atom that has remained attached to the other silicon atom. The result is that each silicon atom that was formerly bonded to the other silicon atom through an oxygen atom now has a hydroxide group attached to it, thus removing the silicon-oxygen-silicon bond. The two silicon atoms are thus modified by two hydroxide groups (Si—OH HO—Si).

One set of experimental results was obtained using a sample of glass beads of 29 micron size. The glass beads were placed in an autoclave at 390°C and 1,090 psi in an atmosphere of saturated water vapor for approximately 2 hours with a resultant weight gain of approximately 13.8 percent. The weight gain is directly attributable to the water associating with the glass as hydroxide groups within the glass structure.

The crucible containing the modified glass sample was returned to room temperature before being placed into a furnace operating at a temperature of approximately 1,100°C. At this temperature, approximately 3 minutes were required to produce good foaming characteristics as well as partial sintering of the foamed glass sample.

In another experiment a glass sample was introduced into the saturated water vapor environment of the autoclave and maintained at approximately 265°C and 650 psi for a lesser period of time than the former sample. This second sample experience an approximate weight gain of only 1.1 percent. This latter sample exhibited less desirable foaming characteristic when placed in the furnace than the former sample that had the higher percent of weight gain. The lack of desirable foaming characteristics is directly attributable to insufficient modification of the glass structure by hydroxide groups.

Experimental results obtained by using methanol and ammonium hydroxide as the hydroxide group furnishing medium are set forth in Tables I and II below.

glass sample tends to sinter. The sintered surface of the glass sample inhibits additional hydroxide modification of the internal glass structure. Although this latter condition constitutes a problem in creating uniformity in the autoclaved glass product, it further illustrates the discovery that modification of the glass structure with hydroxide groups causes a lowering of the softening temperature of the glass.

Foaming characteristics of the glass samples set forth in Tables I and II above appeared to be dependent to some degree upon the rapidity with which the heat was

TABLE I

GLASS AUTOCLAVED IN A METHANOL
ENVIRONMENT AT 300°C AND 300 PSI
FOR 1 HOUR BEFORE INTRODUCTION
INTO A FURNACE FOR 20 MINUTES

| Type of Glass | Particle Size in Autoclave | Particle Size in Furnace | Furnace Temperature | Foaming Characteristics |
|---|---|---|---|---|
| | (Microns) | (Mesh) | (°C) | |
| Brown Beer Bottle | 2 – 20 | 325 | 850 | Poor |
| do. | 2 – 20 | 325 | 890 | Good |
| do. | 2 – 20 | 325 | 910 | Good |
| do. | 2 – 20 | Ground but Unsifted | 930 | Good |
| Soda Lime Cullet | 2–20 | do. | 850 | Poor |
| do. | 2–20 | do. | 890 | Good |
| do. | 2–20 | do. | 910 | Fair |
| "Superbrite 380" Glass Beads | 30 | do. | 850 | Poor |
| do. | 30 | do. | 890 | Poor |
| do. | 30 | do. | 910 | Fair |
| do. | 30 | do. | 930 | Fair |

TABLE II

GLASS AUTOCLAVED IN AN AMMONIUM HYDROXIDE
ENVIRONMENT AT 300°C AND 300 PSI FOR
1 HOUR BEFORE INTRODUCTION INTO
A FURNACE FOR 20 MINUTES

| Type of Glass | Particle Size in Autoclave | Particle Size in Furnace | Furnace Temperature | Foaming Characteristics |
|---|---|---|---|---|
| | (Microns) | (Microns) | (°C) | |
| Brown Beer Bottle | 2 – 20 | Ground but Unsifted | 850 | Very Good |
| do. | 2 – 20 | do. | 870 | Very Good |
| do. | 2 – 20 | do. | 890 | Very Good |
| Soda Lime Cullet | 2 – 20 | do. | 850 | Good |
| do. | 2 – 20 | do. | 890 | Good |
| do. | 2 – 20 | do. | 910 | Very Good |
| "Superbrite 380" Glass Beads | 30 | 74 (Approx.) | 850 | Poor |
| do. | 30 | 74 (Approx.) | 890 | Fair |
| do. | 30 | 74 (Approx.) | 910 | Fair |
| do. | 30 | 43 (Approx.) | 930 | Good |

Modification of the glass structure with hydroxide groups furnished by either ammonium hydroxide or methanol is accomplished by placing an excess of the medium with the glass samples in the autoclave. Increasing temperature causes an increase in pressure by the hydroxide group furnishing medium. Excess pressure is bled off to maintain the desired pressure in the autoclave.

It has been found that nonuniformity exists in glass from the autoclave in that the softening temperature of the glass lowers as the hydroxide groups modify the glass structure with the result that the surface of the transmitted to the total glass sample. One theory postulated is that the more rapid heat transfer to the interior of the glass sample permits the hydroxide release from the glass structure internally within the glass sample and the formation and release of water vapor therein before the hydroxide groups are release completely from the glass structure in the external surface of the glass sample with its subsequent sintering and elevation of softening temperature. The result being that there tends to be uniform foaming throughout the glass sample. This characteristic, of course, would be of lesser significance if the glass is foamed by passing it through a vertical furnace or flame gun since the glass would be in a relatively finely divided condition and not as relatively large samples as were the experiments set forth in Tables I and II above.

Modification of the glass structure with hydroxide groups is also possible to a limited degree by causing an ion exchange to take place between the sodium ions which are normally used to modify glass and the hydrogen ions in water. These results are obtainable when glass previously modified with sodium ions is immersed in water, preferably with an acidic content. For example, if the glass has previously been modified with sodium oxide ($Na_2O$), the two available sodium atoms from the sodium oxide attach to each oxygen atom to form (Si—ONa, NaO—Si), thus removing the normal (Si—O—Si) bond of glass structure. By ion exchange, the hydrogen from the water exchanges for the sodium ion to then form the hydroxide (OH) attachment to each silicon atom to form the structure (Si—OH, HO—Si). The end result is a modified silica chain which has been modified with hydroxide groups rather than sodium atoms.

It is believed that the modification or breaking up of the bond network within the silica lowers the viscosity of the glass such that it will soften at a lower temperature than an unmodified silica structure. As a result, a silica structure modified with hydroxide ions, upon heating, tends to soften before the hydroxide groups start releasing from the glass structure. Further heating causes the release of hydroxide groups which react with other hydroxide groups to form water vapor. The water vapor thus formed is entrapped within the softened glass to form bubbles therein. The extra oxygen remaining from this reaction (OH + OH — $H_2O$ + O) reunites with the silicon atoms to reform the original bond network of (Si—O—Si). Reformation of the Si—O—Si bond increases the softening temperature of the glass with the result that the glass softens, water vapor is released and forms bubbles within the softened glass, and then the glass stiffens about these bubbles creating a cellular glass product. It is further postulated that the rapid foaming characteristic exhibited in the experimental sample is a result of a "popcorn" effect in that the external surface of the glass particle stiffens upon the initial release of hydroxide groups therefrom and the internally bound hydroxide groups create pressure upon release from the glass structure and cause the glass particle to literally explode.

One proposal that has been advanced to explain the foregoing phenomena is that the viscosity of glass decreases in proportion to the square root of the partial pressure of the water that has been reacted with the glass. This equation is based upon the assumption that all reactions are in equilibrium.

The modification of the glass structure with hydroxide groups proceeds much more rapidly at elevated temperatures and pressures although it is possible to obtain some modification of the glass structure with hydroxide groups at room temperature and pressure. However, this latter set of operating conditions would appear to be less economical due to the time required and the relatively slow reaction rate.

One obvious advantage of the present invention is its ability to economically utilize waste glass materials such as discarded bottles, jars, window glass, etc., as a raw material for the production of construction and/or insulation material. Presently such waste glass materials are not usable except as an aggregate base for asphalt, cement, or plaster or as cullet for manufacture of glass providing, of course, the glass is first properly sorted due to coloration problems. It is not always feasible to melt waste glass to reuse in bottle or jar manufacture since many of the bottles as manufactured contain coloration materials which lend an undesirable color characteristic to the recycled glass. Physical separation of various colored waste glass fragments is not practical at present and thus the usefulness of such waste glass in a recycling process is extremely limited. Additionally, glass furnaces are distant from many population centers making transportation of properly sorted waste glass an additional deterrent to its use in recycling.

One possible application of this invention could be in the manufacture of blocks or bricks useful in the construction industry. For example, one process would start with the initial collection of waste glass from various recycling points where the glass is salvaged from the normal discard stream such as garbage collection, etc. The waste glass is suitably cleansed and ground or otherwise finely divided before being passed into an autoclave. In the autoclave the glass is subjected to a saturated steam environment at an elevated temperature and pressure to thereby modify the glass structure with hydroxide (OH) groups. The glass thus modified is then passed through a furnace such as a vertical furnace wherein it is first, softened, and then foamed by water vapor formed by the release of hydroxide groups. From the furnace, the still soft, foamed glass will collect on a moving belt to a suitable thickness, allowed to stiffen or harden, and thereafter, annealed to relieve stresses. The moving slab of rigid foamed glass is then passed through a series of saws which cut it into predetermined shapes useful in the building industry.

The resultant product is therefore a dimensionally accurate building block that is structurally sound and has very good insulating qualities. The quality of being dimensionally stable is an important feature for this type of block since dimensional integrity is one of the greater problems to be overcome in the manufacture of other building blocks such as bricks and concrete blocks. Furthermore, such a building block manufactured from foamed glass is very light but strong, thus enhancing the use of this type of block in construction where weight of the wall system is of prime consideration. In addition to being dimensionally sound, insulative, and light weight, a building block constructed of foamed glass is also fire proof, which in itself is a very important consideration for certain applications.

Another application of this invention would be to create a granular, cellular glass product useful as an aggregate base for such items as a light weight concrete block, thus replacing the conventional pumice normally used therein. Such a granular-cellular glass product would also be very useful in certain forms of insulation in walls, ceilings, etc., of homes wherein the insulation is placed after the building has been constructed. Such an insulation is blown into the wall or ceiling, etc., by conventional air transport methods.

Many uses can be conceived for the utilization of such a product produced from modified waste glass materials. However, of prime consideration should be the fact that invention disclosed herein offers a useful and economical means for eliminating a substantial solid waste problem posed by the accumulation of waste glass materials from such items as the non-returnable bottle, broken window glass, jars, etc.

I claim:

1. A method of producing a foamed glass product comprising the steps of:

obtaining a finely divided glass;

lowering the softening temperature of the glass from a first, higher softening temperature to a lower, second softening temperature by reacting the glass with a hydroxide group furnishing medium selected from the group consisting of water, methanol, and ammonium hydroxide by autoclaving the glass and medium at a temperature below the softening temperature of the glass thereby reacting the glass structure with the hydroxide groups;

removing the glass from the autoclave;

heating the glass under substantially atmospheric pressure to the second lower, softening temperature thereby releasing the hydroxide groups from the glass structure and forming water vapor to obtain foaming of the softened glass, the softening temperature of the glass being raised by the release of the hydroxide groups thereby stiffening the glass and entrapping the water vapor therein.

2. A method of creating a foamed glass product comprising the steps of:

obtaining a finely divided waste glass;

reacting the molecular structure of the glass with hydroxide groups thereby lowering the softening temperature of the glass from a first, higher softening temperature to a second, lower softening temperture;

heating the glass to the lower softening temperature but below the melting point of the unmodified glass to thereby soften the modified glass and release the hydroxide groups from the structure of the glass, the hydroxide groups combining to form water vapor;

foaming the softened glass with the water vapor while raising the softening temperature of the glass by releasing the hydroxide groups from the glass molecular structure; and cooling the foamed glass.

3. A method as defined in claim 2 wherein the modifying step is followed by a pelletizing step so as to form discrete pellets of foamed glass during the following steps of heating, foaming and cooling.

* * * * *